United States Patent
Jang et al.

(10) Patent No.: US 12,431,828 B2
(45) Date of Patent: Sep. 30, 2025

(54) METHOD AND DEVICE FOR OPTIMALLY DESIGNING TOPOLOGY OF PERMANENT MAGNET-INSERTED ELECTRIC MOTORS BY CONSIDERING MAXIMUM-TORQUE-PER-AMPERE CONTROL PERFORMANCE AND FIELD-WEAKENING CONTROL PERFORMANCE

(71) Applicant: Korea Advanced Institute of Science and Technology, Daejeon (KR)

(72) Inventors: In Gwun Jang, Daejeon (KR); Changwoo Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 252 days.

(21) Appl. No.: 18/211,904

(22) Filed: Jun. 20, 2023

(65) Prior Publication Data
US 2024/0171103 A1    May 23, 2024

(30) Foreign Application Priority Data
Nov. 16, 2022   (KR) .................. 10-2022-0153700

(51) Int. Cl.
*H02P 21/22*       (2016.01)
*H02K 1/276*     (2022.01)
*H02P 21/14*       (2016.01)
*H02P 21/26*       (2016.01)

(52) U.S. Cl.
CPC ............ *H02P 21/22* (2016.02); *H02P 21/141* (2013.01); *H02P 21/26* (2016.02); *H02K 1/276* (2013.01)

(58) Field of Classification Search
CPC ........ H02P 21/22; H02P 21/141; H02P 21/26; H02K 1/276; H02K 1/2706; H02K 21/028; H02K 2215/00; G06F 30/17; G06F 30/23; G06F 2111/04; G06F 2111/06
See application file for complete search history.

(56) References Cited

FOREIGN PATENT DOCUMENTS

CN         105978434 A  *  9/2016

OTHER PUBLICATIONS

Jae Seok Choi, Topology Optimization of the Stator for Minimizing Cogging Torque of IPM Motors, 2011, IEEE, 3024-3027 (Year: 2011).*
Milorad Risticevic, Topological Approach for Minimization of Cogging Torque in Permanent Magnet Synchronous Motors, 2020, IETA, 97-104 (Year: 2020).*

* cited by examiner

*Primary Examiner* — Bickey Dhakal
(74) *Attorney, Agent, or Firm* — ArentFox Schiff LLP; Joseph M. Maraia; Marlo S. Grolnic

(57) ABSTRACT

The present disclosure proposes a method and device for optimally designing the topology of a permanent magnet insertion type electric motor by considering maximum torque control performance per ampere and field-weakening control performance. According to the present disclosure, for a topology optimization-based design of an electric motor including a stator and a rotor and having a permanent magnet inserted into the rotor, a computer device is configured to calculate an optimal current control condition for the stator according to a structure of the rotor and to derive a topology optimization-based design of the rotor by applying the optimal current control condition.

18 Claims, 13 Drawing Sheets

$\Phi_{PM}(\rho)$

METHOD AND DEVICE FOR OPTIMALLY DESIGNING TOPOLOGY OF PERMANENT MAGNET-INSERTED ELECTRIC MOTORS BY CONSIDERING MAXIMUM-TORQUE-PER-AMPERE CONTROL PERFORMANCE AND FIELD-WEAKENING CONTROL PERFORMANCE

CROSS-REFERENCES TO RELATED APPLICATION

This application is based on and claims priority under 35 U.S.C. 119 to Korean Patent Application No. 10-2022-0153700, filed on Nov. 16, 2022 in the Korean intellectual property office, the disclosures of which are herein incorporated by reference in their entireties.

TECHNICAL FIELD

The present disclosure relates to a method and device for optimally designing the topology of a permanent magnet insertion type electric motor by considering maximum torque control performance per ampere and field-weakening control performance.

BACKGROUND OF THE DISCLOSURE

A permanent magnet insertion type electric motor is a motor having a form in which a permanent magnet has been inserted into an iron core structure within an electric rotor, and has an advantage in that it has very high torque and output per unit volume compared to a non-rare earth material motor because the permanent magnet increases magnetic flux density of the iron core. Due to such an advantage, the permanent magnet insertion type electric motor is widely used as a motor for an eco-friendly vehicle, and the demand for the permanent magnet insertion type electric motor is increasing.

However, expensive rare earth materials are used to manufacture the permanent magnet. As the prices of the raw materials recently rise, the prices of the rare earth materials also suddenly rise. Furthermore, since 90% or more of the supply and demand of global rare earth materials depends on China, the supply and demand of the rare earth materials is impossible depending on an international situation even though expensive costs for the rare earth materials are paid.

Accordingly, from the aspect of a structure design and current control, there is an urgent need to develop a permanent magnet insertion type electric motor capable of minimizing the amount of permanent magnets used and also maximizing torque per unit volume.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An embodiment of the present disclosure proposes a method and device for optimally designing the topology of a permanent magnet insertion type electric motor by considering maximum torque control performance per ampere and field-weakening control performance.

In an embodiment, a method of a computer device for a topology optimization-based design of an electric motor including a stator and a rotor and having a permanent magnet inserted into the rotor includes calculating an optimal current control condition for the stator according to a structure of the rotor, and deriving a topology optimization-based design of the rotor by applying the optimal current control condition.

In an embodiment, a computer device for a topology optimization-based design of an electric motor including a stator and a rotor and having a permanent magnet inserted into the rotor includes memory, and a processor connected to the memory and configured to execute at least one instruction stored in the memory. The processor is configured to calculate an optimal current control condition for the stator according to a structure of the rotor and to derive a topology optimization-based design of the rotor by applying the optimal current control condition.

In an embodiment, there is provided a non-transitory computer-readable recording medium in which a computer program for executing, in a computer device, a method for a topology optimization-based design of an electric motor including a stator and a rotor and having a permanent magnet inserted into the rotor. The method includes calculating an optimal current control condition for the stator according to a structure of the rotor, and deriving a topology optimization-based design of the rotor by applying the optimal current control condition.

Accordingly, in a conventional technology, an arbitrary fixed current was applied to the stator. In contrast, in the present disclosure, a current can be adaptively applied to the stator because an optimal current control condition according to a structure of the rotor is recalculated from the results of multiphysics finite element analysis of the rotor. Specifically, when a topology optimization-based design is performed, the topology of the rotor is changed into a structure for minimizing a objective function while satisfying a constraint according to an optimization iteration. In this case, in the present disclosure, a current can be adaptively applied to the stator because the optimal current control condition according to a change in the structure of the rotor is recalculated.

Furthermore, in a conventional technology, it is difficult to design an electric motor having non-linearity (e.g., magnetic flux saturation and leakage magnetic flux) and a complicated structure because structure information of the rotor, for example, the thicknesses, locations, and numbers of webs and a bridge are previously designed based on an engineer's intuition. In the present disclosure, however, a complicated electric motor having multiple constraints can be easily designed without the need to depend on an engineer's intuition because complicated structure information on the iron core of the rotor is not required by applying the topology optimization-based design. That is, through the present disclosure, a rotor design having high torque and an optimal current condition can also be derived.

As a result, the present disclosure can significantly reduce time and expenses that are necessary for a design, manufacturing, and experiments by making unnecessary the production of multiple single-products and repeated experiments for each single-product.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, various embodiments of the present disclosure are described with reference to the accompanying drawings.

Figure 1:
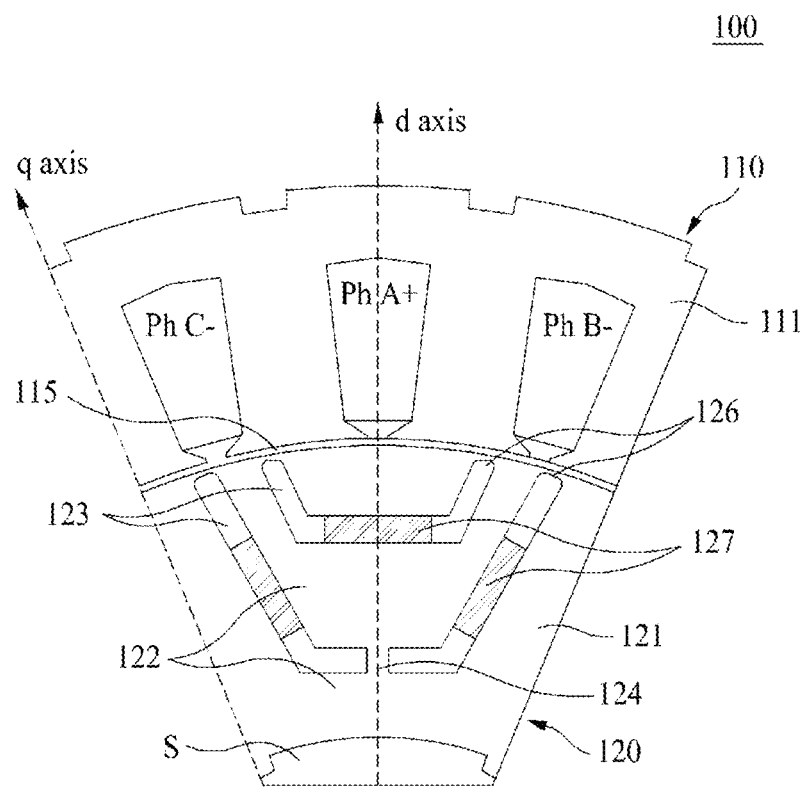
FIG. 1 is a diagram illustrating a structure of a common permanent magnet insertion type electric motor.
Figure 2:
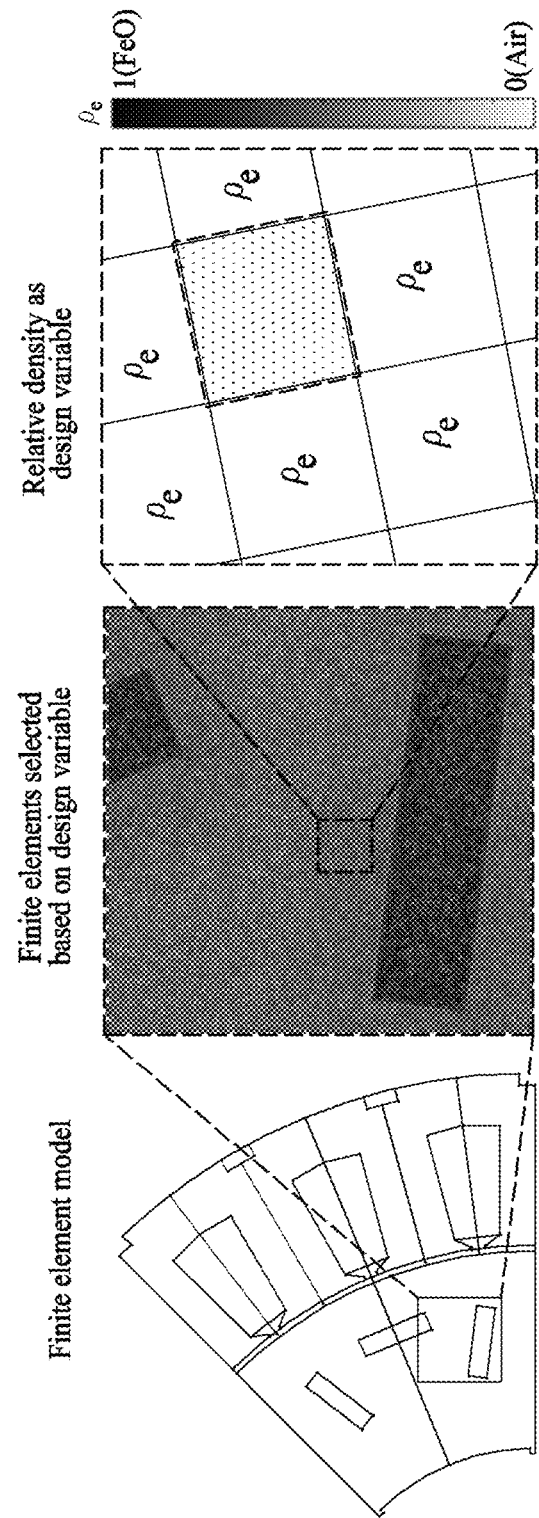
FIG. 2 is a diagram for describing the selection of a design variable for the topology optimization-based design of the electric motor according to the present disclosure.

FIG. 1 is a diagram illustrating a structure of a common permanent magnet insertion type electric motor 100. FIG. 2 is a diagram for describing the selection of a design variable for the topology optimization-based design of the electric motor 100 according to the present disclosure.

Referring to FIG. 1, the electric motor 100 includes a stator 110 and a rotor 120, and operates based on torque that is generated by an interaction between magnetic flux (e.g., an N pole) of the rotor 120 and magnetic flux (e.g., the S pole) of the stator 110. In this case, the rotor 120 is implemented so that the rotor 120 is rotated around a shaft S within the stator 110. In this case, an airgap 115 is provided between the stator 110 and the rotor 120.

The stator 110 includes an iron core 111 and winding (not illustrated). As a current is applied to the winding, magnetic flux is generated and induced into the iron core 111.

The rotor 120 includes an iron core 121 and at least one permanent magnet 127. The iron core 121 includes a plurality of webs 122, at least one bridge 124, and a plurality of ribs 126. The webs 122 prevent local magnetic saturation by distributing magnetic flux concentrated thereon. To this end, the rotor 120 is equipped with at least one barrier 123 between the webs 122. The webs 122 are mutually separated from each other by the barriers 123. The bridge 124 and the ribs 126 function to structurally support the rotor 120 so that the rotor 120 can withstand a load applied thereto, that is, so that the webs 122 are not fluttered, when the rotor 120 is rotated. The bridge 124 and the ribs 126 connect the webs 122 while intersecting the barriers 123. The bridge 124 intersects a central area of the barrier 123 so that the barriers 123 are separated from each other with the bridge 124 interposed therebetween. The ribs 126 intersect areas of the barrier 123 on both sides thereof so that the barrier 123 is separated from the airgap 115 by the rib 126. The permanent magnet 127 can reinforce magnetic flux that flows along the webs 122. The permanent magnet 127 is inserted between the webs 122, that is, into the inside of the barrier 123.

In the rotor 120, the permeability of iron is about 1,000 times higher than that of the air, and thus magnetic flux of the rotor 120 tries to flow along the iron core 121. Net magnetic flux of the rotor 120 may be represented as the sum of magnetic flux attributable to reluctance and magnetic flux attributable to the permanent magnet 127. As illustrated in FIG. 1, the web 122 has a salient structure. When the web 122 is rotated, magnetic flux permeability that is seen from the stator 110 is changed. That is, when the rotor 120 is rotated, torque is generated even without the permanent magnet 127 because a total amount of the magnetic flux of the rotor 120, which is transmitted, is changed. In general, this is called reluctance torque. The magnetic flux that is generated by the permanent magnet 127 flows along the webs 122. As a result, the torque can be increased because the magnetic flux density of the webs 122 is increased. In general, this is called permanent magnet torque. As described above, the torque is generated by an interaction between the magnetic flux of the stator 110 and the magnetic flux of the rotor 120. Accordingly, it is necessary to perform current control based on how current will be applied by considering the magnetic flux of the rotor 120.

However, the webs 122 and the bridge 124 show a complicated magnetic flux pattern, and generate magnetic non-linearity attributable to magnetic saturation and leakage magnetic flux. In this case, the bridge 124 and the ribs 126 may form a representative leakage magnetic flux path. Furthermore, the permanent magnet 127 may have a weak structure that has very small stiffness and that is breakable. The webs 122 and the bridge 124 need to be designed so that the permanent magnet 127 can be structurally supported. Accordingly, since a design in which multiphysics for the rotor 120 are considered is very complicated and non-intuitive, multiphysics finite element analysis may be essential. Furthermore, torque needs to be generated by mutually inducing the magnetic flux of the rotor 120 and the magnetic flux of the stator 110. After a single-product of the electric motor 100 is manufactured, experiments for checking characteristics of magnetic flux of the rotor 120 need to be performed. Accordingly, a lot of time and expenses are required because an optimal current control condition needs to be found through the single-product manufacturing and experiments.

Hereinafter, a computer device 200 for a topology optimization-based design of the electric motor 100 and a method of the computer device 200 are described. In this case, the topology optimization-based design may indicate methodology capable of minimizing or maximizing a objective function while satisfying multiple constraints by dividing a design area into fixed grids and using a relative density value ($\rho_e$) of each element as a design variable. The topology optimization-based design scheme provides a very high degree of design freedom compared to an experiment plan method or a shape-optimization design.

Specifically, the topology optimization-based design of the rotor 120 has an object of obtaining an optimized structure of the iron core 121 by considering magnetic non-linearity (e.g., magnetic saturation and leakage magnetic flux) when a location of the permanent magnet 127 is fixed. In the present disclosure, as illustrated in FIG. 2, the rotor 120 is divided into finite elements, and relative density ($\rho_e$) of each finite element is set as a design variable. In this case, a black finite element means iron ($\rho_e$=1), and a white finite element means the air ($\rho_e$=0). In this case, a set of the design variables may be represented as follows: $\rho=[\rho_1, \rho_2, \ldots \rho_{emax}]T$.

According to the present disclosure, the tendency of an optimized iron core 121 is analyzed by fixing a shape and location of the permanent magnet 127 and changing the strength of the permanent magnet 127. That is, if the strength of the permanent magnet 127 is differently applied, magnetic flux characteristics of the rotor 120 are changed. Accordingly, whether an optimal current control condition is well found can be analyzed based on a change in the magnetic flux characteristics of the rotor 120. Accordingly, the validity of the present disclosure can be proven. In this case, the shape and location of the permanent magnet 127 may be changed depending on a given condition.

Figure 3:
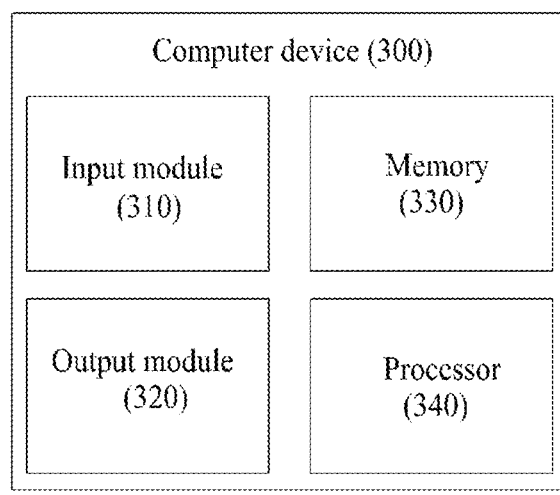
FIG. 3 is a diagram schematically illustrating a computer device 300 for the topology optimization-based design of the electric motor according to the present disclosure.

FIG. 3 is a diagram schematically illustrating a computer device 300 for the topology optimization-based design of the electric motor 100 according to the present disclosure.

Referring to FIG. 3, the computer device 300 includes at least one of an input module 310, an output module 320, memory 330, or a processor 340. In an embodiment, at least one of the components of the computer device 300 may be omitted, and at least one other component is added to the components of the computer device 300. In an embodiment, at least two of the components of the computer device 300 are implemented as one integrated circuit.

The input module 310 receives a signal to be used for at least one component of the computer device 300. The input module 310 includes at least one of an input device configured to enable a user to directly input a signal to the computer device 300, a sensor device configured to generate a signal by sensing a surrounding change, or a reception device configured to receive a signal from an external device. For example, the input device includes at least one of a microphone, a mouse, or a keyboard. In an embodiment, the input device includes at least one of touch circuitry configured to detect a touch or a sensor circuit configured to measure the intensity of a force generated by a touch.

The output module 320 outputs information to the outside of the computer device 300. The output module 320 includes at least one of a display device configured to visually output information, an audio output device capable of outputting information in the form of an audio signal, or a transmission device capable of wirelessly transmitting information. For example, the display device includes at least one of a display, a hologram device or a projector. For example, the display device is assembled with at least one of the touch circuit or sensor circuit of the input module 310, and is thus implemented as a touch screen. For example, the audio output module includes at least one of a speaker or a receiver.

According to an embodiment, the reception device and the transmission device is implemented as a communication module. The communication module performs communication with an external device in the computer device 300. The communication module establishes a communication channel between the computer device 300 and the external device, and performs communication with the external device through the communication channel. In this case, the external device includes at least one of a vehicle, a satellite, a base station, a server or another computer system. The communication module includes at least one of a wired communication module or a wireless communication module. The wired communication module is connected to the external device in a wired way, and communicates with the external device in a wired way. The wireless communication module includes at least one of a short-distance communication module or a long-distance communication module. The short-distance communication module communicates with the external device using the short-distance communication method. For example, the short-distance communication method includes at least one of Bluetooth, Wi-Fi direct, or infrared data association (IrDA). The long-distance communication module communicates with the external device using the long-distance communication method. In this case, the long-distance communication module communicates with the external device over a network. For example, the network includes at least one of a cellular network, the Internet, or a computer network, such as a local area network (LAN) or a wide area network (WAN).

The memory 330 stores various data used by at least one component of the computer device 300. For example, the memory 330 includes at least one of a volatile memory or a nonvolatile memory. The data includes at least one program and input data or output data related thereto. The program may be stored in the memory 330 as software including at least one instruction, and includes at least one of an operating system, middleware, or an application.

The processor 340 controls at least one component of the computer device 300 by executing a program of the memory 330. Accordingly, the processor 340 performs data processing or an operation. In this case, the processor 340 executes an instruction stored in the memory 330.

According to various embodiments, the processor 340 performs multiphysics finite element analysis. In this case, the multiphysics finite element analysis includes electromagnetic finite element analysis and structural finite element analysis. An object of the electromagnetic finite element analysis is to calculate average torque and a torque ripple of a given topology. If a solid isotropic material with penalization (SIMP) method, that is, a well-known topology optimization-based design scheme, is applied, the average torque and the torque ripple may be represented as functions of the design variable ($\rho_e$). An object of the structural finite element analysis is to calculate structural compliance of a given topology. The calculation of the structural compliance requires a load and stiffness. If the SIMP method is applied, the load and the stiffness may be represented as functions of the design variable. That is, the structural compliance may be represented as a function of the design variable.

According to various embodiments, the processor 340 calculates an optimal current condition. When the topology optimization-based design is performed, the topology of the rotor 120 is changed into a structure for minimizing a objective function while satisfying a constraint according to an optimization iteration. In this case, the computer device 300 can adaptively apply a current to the stator 110 because the optimal current control condition according to a change in the structure of the rotor 120 is recalculated from the results of the multiphysics finite element analysis of the rotor 120. In contrast, in a conventional technology, an arbitrary fixed current is applied to the stator 110.

According to various embodiments, the processor 340 performs the topology optimization-based design. In this case, an SIMP-based topology optimization-based design requires a objective function of each design variable ($\rho_e$) and sensitivity (slope) information for a constraint in order to update the design variable. The SIMP-based topology optimization-based design essentially requires the calculation of sensitivity because several hundreds of to millions of design variables are used for the SIMP-based topology optimization-based design. Accordingly, the processor 340 derives the topology optimization-based design that minimizes or maximizes the objective function while satisfying the constraint by using the sensitivity.

Figure 4:
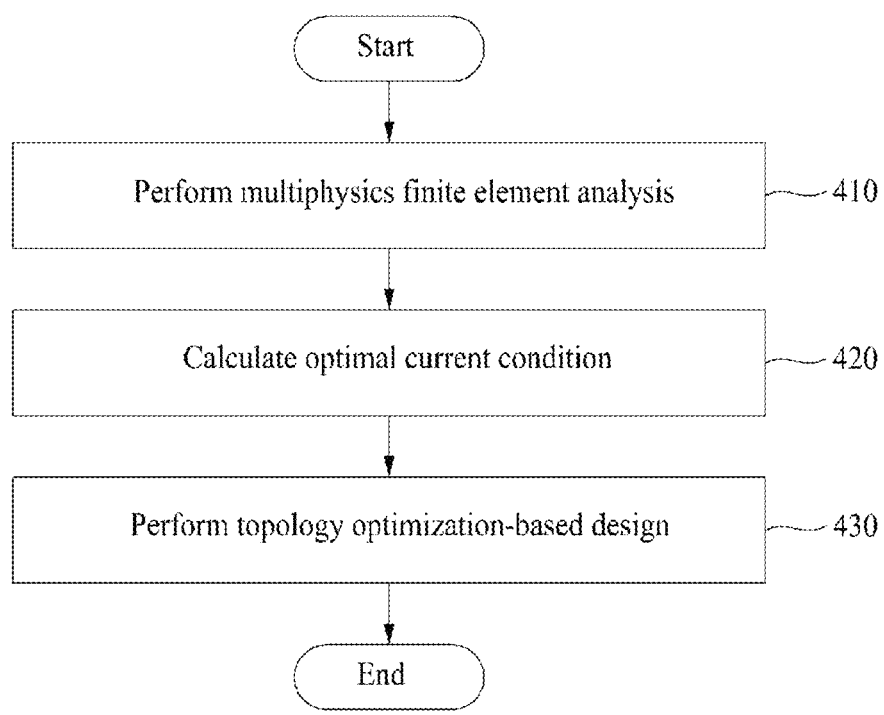
FIG. 4 is a diagram illustrating a method of the computer device for the topology optimization-based design of the electric motor according to the present disclosure.
Figure 5:
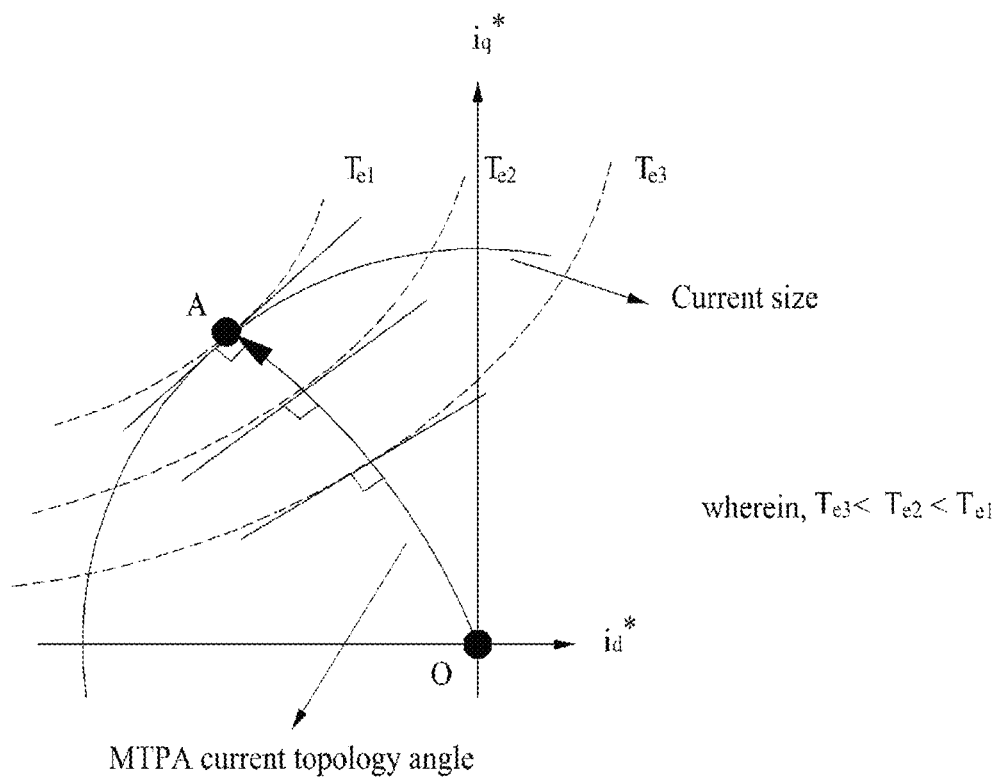
FIG. 5 is a diagram for describing a step of calculating an optimal current condition in FIG. 4.

FIG. 4 is a diagram illustrating a method of the computer device 300 for the topology optimization-based design of the electric motor 100 according to the present disclosure. FIG. 5 is a diagram for describing a step (step 420) of calculating an optimal current condition in FIG. 4.

Referring to FIG. 4, in step 410, the computer device 300 performs multiphysics finite element analysis. In this case, the multiphysics finite element analysis includes electromagnetic finite element analysis and structural finite element analysis.

An object of the electromagnetic finite element analysis is to calculate average torque and a torque ripple of a given topology. If the SIMP method, that is, a well-known topology optimization-based design scheme, is applied, the average torque and the torque ripple may be represented as functions of the design variable ($\rho_c$).

An equation for the electromagnetic finite element analysis may be represented as in Equation 1.

$$\left(\frac{\partial}{\partial x}\left(v\frac{\partial A_z}{\partial x}\right) + \frac{\partial}{\partial y}\left(v\frac{\partial A_z}{\partial y}\right) = J_z\right)|_{\theta_k=const, i_d=const, i_q=const} \quad (1)$$

A torque equation, such as Equation 2, may be obtained as the output of the electromagnetic finite element analysis.

$$T(\theta_k, i_d, i_q) = T(A_z)|_{\theta_k=const, i_d=const, i_q=const} \quad (2)$$

The equations in Equations 3 and 4 are examples of the SIMP method for the electromagnetic finite element analysis. When 1 is put into the design variable ($\rho_c$), in Equation 4, $v^{(SIMP)}$ becomes $v^{(iron)}$. When 0 is put into the design variable ($\rho_c$), in Equation 4, $v^{(SIMP)}$ becomes $v^{(air)}$ (refer to FIG. 2).

$$H_e = v^{(SIMP)}(\rho_e)B_e \quad (3)$$

$$v^{(SIMP)}(\rho_e) = (1-(\rho_e)^{p^{(electric)}})v^{(air)} + (\rho_e)^{p^{(electric)}}v^{(iron)} \quad (4)$$

When Equations 3 and 4 are applied to Equation 2, torque may be represented as a function of the design variable as in Equation 5.

$$T(\theta_k, \rho, i_d, i_q) = T(\theta_k, i_d, i_q) \quad (5)$$

That is, average torque and a torque ripple may be represented as a function of a design variable set ($\rho=[\rho_1, \rho_2, \ldots, \rho_{emax}]^T$). Equations 6 and 7 are examples of calculated average torque and a calculated torque ripple, respectively.

$$T_{avg}(\rho, i_d, i_q) = \frac{1}{k_{max}}\sum_{k=1}^{k_{max}} T(\theta_k, \rho, i_d, i_q) \quad (6)$$

$$T_{ripple}(\rho, i_d, i_q) = T_{rms}(\rho, i_d, i_q) - T_{avg}(\rho, i_d, i_q) = \quad (7)$$

$$\left(\frac{1}{k_{max}}\sum_{k=1}^{k_{max}}(T(\theta_k, \rho, i_d, i_q))^2\right)^{1/2} - \frac{1}{k_{max}}\sum_{k=1}^{k_{max}} T(\theta_k, \rho, i_d, i_q)$$

An object of the structural finite element analysis is to calculate structural compliance of a given topology. The calculation of the structural compliance requires a load and stiffness. If the SIMP method is applied, a load and stiffness may be represented as a function of a design variable. That is, the structural compliance may be represented as a function of the design variable ($\rho_c$). In the present disclosure, a design-dependent load is applied in order to calculate the structural compliance.

Equation 8 illustrates an example of a design-dependent mechanical load. If the design-dependent load is applied, a load is applied only when iron is present. In the example of the present disclosure, a centripetal force and a force attributable to rotational angular acceleration, which are generated upon rotation, are applied. In this case, when 1 is put into the design variable ($\rho_e$), in Equation 8, F=0 is obtained. When 0 is put into the design variable ($\rho_e$), in Equation 8, F becomes a maximum value (i.e., F=a maximum value).

$$\begin{cases} F_e^{(radial)} = \rho_e m_e r_e \omega_m^2 \\ F_e^{(circumferential)} = \rho_e m_e r_e \alpha \end{cases} \quad (8)$$

If the structural SIMP method is applied, Young's modulus ($E_c$) of each finite element may be represented as in Equation 9. In this case, when 1 is put into the design variable ($\rho_e$), in Equation 9, $E=E^{(iron)}$. When 0 is put into the design variable ($\rho_e$), in Equation 9, $E=E^{(min)}$.

$$E_e = (1-(\rho_e)^{p^{(mechanical)}} + (\rho_e)^{p^{(mechanical)}}E^{(iron)} \quad (9)$$

In the structural finite element analysis, when a load vector (F) and a stiffness matrix (K) are given, a displacement vector (u) is interpreted. In this case, the stiffness matrix (K) is a function of $E_e$, such as Equation 9. Accordingly, the stiffness matrix (K) may be obtained by applying Equation 9, and the load vector (F) may be obtained by applying Equation 8. The displacement vector (u) may be interpreted as in Equation 10 through the structural finite element analysis.

$$Ku = F \quad (10)$$

As in Equation 11, structural compliance (C($\rho$)) may be calculated as a function of the design variable by using the calculated displacement vector (u).

$$C(\rho) = (F(\rho))^T u = u^T K(\rho) u \quad (11)$$

Next, in step 420, the computer device 300 calculates an optimal current condition. When the topology optimization-based design is performed, the topology of the rotor 120 is changed into a structure for minimizing a objective function while satisfying a constraint according to an optimization iteration. In this case, the computer device 300 can adaptively apply a current to the stator 110 because the computer device 300 recalculates an optimal current control condition according to a change in the structure of the rotor 120 based on the results of the multiphysics finite element analysis of the rotor 120. In contrast, in a conventional technology, an arbitrary fixed current is applied to the stator 110.

The present disclosure can obtain multiple motor parameters by parameterizing the electric motor 100 in order to calculate the optimal current control condition according to a change in the topology of the electric motor 100. The motor parameters include strength ($\Phi_{PM}$) of the permanent magnet 127, and a difference ($L_{qd}=L_q-L_d$) between q-axis inductance and d-axis inductance indicative of a saliency ratio of the iron core 121 in a d-q axis rotation coordinate system. Inductance is the physical quantity of electricity that is generated when a current flows.

Maximum torque of the electric motor 100 is generated at a maximum current. In the rotation coordinate system, a relation between a d axis current ($i_d$) and a q axis current ($i_q$) may be represented as in Equation 12. If the motor parameters and) are known, the torque may be represented as in Equation 13.

$$T_{avg} = (3/4)P_r(\Phi_{PM}i_q + (L_d-L_q)i_q i_d) \quad (13)$$

A core of the present disclosure is that the motor parameters ($\Phi_{PM}$ and $L_{qd}=L_q-L_d$) can be represented as functions of the design variable set ($\rho=[\rho_1, \rho_2, \ldots, \rho_{emax}]^T$). If the SIMP equation is used, average torque is a function of the design variable set ($\rho$). Accordingly, $\Phi_{PM}$ and $L_{qd}=L_q-L_d$ may be represented as functions $\Phi_{PM}(\rho)$ and $L_{qd}(\rho)$ of a set of design variables. That is, as in Equations 14 and 15, motor parameters $\Phi_{PM}(\rho)$ and $L_{qd}(\rho)$ can be easily calculated from the design variable set ($\rho$).

$$\Phi_{PM}(\rho) = \frac{4}{3} \frac{1}{I_{s\,max}\cos(\beta^*)} \frac{T_{avg}(\rho, i_d^*, i_q)}{P_r} \quad (14)$$

$$L_{qd}(\rho) = L_q(\rho) - L_d(\rho) = \frac{4}{3} \frac{1}{P_r} \frac{T_{avg}(\rho, i_d, i_q) - T_{avg}(\rho, i_d^*, i_q)}{-i_q(i_d - i_d^*)} \quad (15)$$

The computer device 300 derives an optimal current control condition for the stator 110 by considering a structure of the rotor 120. Specifically, the computer device 300 derives an optimal current condition by putting the calculated motor parameter into "maximum torque per ampere (MTPA)". Accordingly, the optimal current condition may be adaptively updated based on a changing topology when the topology optimization-based design is performed.

When the motor parameters in Equations 14 and 15 are put, an MTPA current topology angle ($\beta^{MPTA}(\rho)$) may be represented as a function of the design variable set ($\rho$) as in Equation 16. That is, an MTPA current condition (or an current topology angle) can be easily calculated from the design variable set ($\rho$). In this case, the current topology angle is changed as illustrated in FIG. 5 depending on a current size in the d-q rotation coordinate system.

$$\beta^{(MTPA)}(\rho) = \sin^{-1}\left(\frac{-\Phi_{PM}(\rho) + \sqrt{\Phi_{PM}^2(\rho) + 8I_{s\,max}^2 L_{qd}^2(\rho)}}{4I_{s\,max}L_{qd}(\rho)}\right) \quad (16)$$

As the topology optimization-based design is performed, in order to satisfy the constraint, an improper shape that instantly generates negative torque is generated. In order to prevent such an improper shape, a valid range of the MTPA current topology angle may be limited by using Equation 17.

$$\overline{\beta}^{(MTPA)}(\rho) = \max\left(\varepsilon, \min\left(\frac{\pi}{4}, \beta^{(MTPA)}(\rho)\right)\right) \quad (17)$$

Finally, when the MTPA current topology angle ($\beta^{MTPA}(\rho)$) in Equation 16 or 17 is put into a torque equation such as Equation 13, average torque can be calculated by considering both a change in the design variable set ($\rho$), such as Equation 18, and MTPA control. That is, MTPA torque can be easily calculated from the design variable set ($\rho$).

$$T_{avg}^{(MTPA)}(\rho) = T_{avg}^{(MTPA)}\left(\rho, \overline{i}_d^{(MTPA)}(\rho), \overline{i}_q^{(MTPA)}(\rho)\right) = \quad (18)$$
$$\frac{3}{4}P_r\left(\Phi_{PM}(\rho)I_{s\,max}\cos\overline{\beta}^{(MTPA)}(\rho) + \frac{1}{2}L_{qd}(\rho)I_{s\,max}^2\sin 2\overline{\beta}^{(MTPA)}(\rho)\right)$$

Next, in step 430, the computer device 300 performs a topology optimization-based design. In this case, an SIMP-based topology optimization-based design requires a objective function of each design variable ($\rho_e$) and sensitivity (slope) information on a constraint in order to update the design variable. The SIMP-based topology optimization-based design essentially requires the calculation of sensitivity because several hundreds of or millions of design variables are used for the SIMP-based topology optimization-based design. For example, when a slope of a objective function is a positive number, the objective function is also increased when a design variable is increased. When a slope of a objective function is a negative number, the objective function is decreased when a design variable is increased. Another core of the present disclosure is that sensitivity can be easily calculated from the design variable set ($\rho$) because all of the average torque (Equation 18), the torque ripple (Equation 7), the structural compliance (Equation 11), the motor parameter (Equations 14 and 15), and the MTPA current topology angle (Equation 16) are functions of the design variables.

Specifically, the computer device 300 calculates the sensitivity of a design variable for representative motor parameters (e.g., magnetic flux, d-axis inductance, and q-axis inductance of the permanent magnet 127) of the electric motor 100, the sensitivity of a design variable for an current topology angle which may generate maximum torque, the sensitivity of a design variable for maximum torque, and the sensitivity of a design variable for a back electromotive voltage, from the results of the finite element analysis, in designing the iron core 121 of the electric motor 100 in which at least one permanent magnet 127 has been inserted into the rotor 120.

Equation 19 illustrates an example the calculation of sensitivity of a design variable for the structural compliance.

$$\frac{\partial C(\rho)}{\partial \rho_e} = 2u^T \frac{\partial F(\rho)}{\partial \rho_e} - u^T \frac{\partial K(\rho)}{\partial \rho_e} u \quad (19)$$

Equations 20 and 21 are examples of the calculation of sensitivity of a design variable for motor parameters.

$$\frac{\partial \Phi_{PM}(\rho)}{\partial \rho_e} = \frac{4}{3} \frac{1}{I_{s\,max}\cos(\beta^*)} \frac{1}{P_r} \frac{\partial T_{avg}(\rho, i_d^*, i_q)}{\partial \rho_e} \quad (20)$$

$$\frac{\partial L_{qd}(\rho)}{\partial \rho_e} = \frac{4}{3} \frac{1}{P_r} \frac{\left(\frac{\partial T_{avg}(\rho, i_d, i_q)}{\partial \rho_e} - \frac{\partial T_{avg}(\rho, i_d^*, i_q)}{\partial \rho_e}\right)}{-(i_d - i_d^*)i_q} \quad (21)$$

Equations 22 to 25 are examples of the calculation of sensitivity of a design variable for an MTPA current topology angle.

$$\frac{\partial \beta^{(MTPA)}(\rho)}{\partial \rho_e} = \quad (22)$$
$$\frac{1}{\cos(\beta^{(MTPA)}(\rho))}\left(\frac{\partial \beta^{(MTPA)}(\rho)}{\partial \Phi_{PM}(\rho)}\frac{\partial \Phi_{PM}(\rho)}{\partial \rho_e} + \frac{\partial \beta^{(MTPA)}(\rho)}{\partial L_{qd}(\rho)}\frac{\partial L_{qd}(\rho)}{\partial \rho_e}\right)$$

$$\frac{\partial \beta^{(MTPA)}(\rho)}{\partial \Phi_{PM}(\rho)} = \frac{\left(\frac{\Phi_{PM}(\rho)}{\sqrt{8I_{s\,max}^2 L_{qd}^2(\rho) - \Phi_{PM}^2(\rho)}} - 1\right)}{4I_{s\,max}L_{qd}(\rho)} \quad (23)$$

$$\frac{\partial \beta^{(MTPA)}(\rho)}{\partial L_{qd}(\rho)} = \frac{2I_{s\,max}}{\sqrt{8I_{s\,max}^2 L_{qd}^2(\rho) + \Phi_{PM}^2(\rho)}} + \quad (24)$$
$$\frac{\Phi_{PM}(\rho) - \sqrt{8I_{s\,max}^2 L_{qd}^2(\rho) + \Phi_{PM}^2(\rho)}}{16I_{s\,max}^2 L_{qd}^2(\rho)}$$

$$\frac{\partial \overline{\beta}^{(MTPA)}(\rho)}{\partial \rho_e} = \begin{cases} \frac{\partial \beta^{(MTPA)}(\rho)}{\partial \rho_e} & \left(\text{if } \varepsilon \leq \beta^{(MTPA)}(\rho) \leq \frac{\pi}{4}\right) \\ 0 & (\text{else}) \end{cases} \quad (25)$$

Equations 26 to 28 are examples of the calculation of sensitivity of design variables for maximum torque in which MTPA control has been considered.

$$\frac{\partial T_{avg}^{(MTPA)}(\rho)}{\partial \rho_e} = \frac{\partial T_{avg}^{(MTPA)}(\rho)}{\partial \overline{\beta}^{(MTPA)}(\rho)} \frac{\partial \overline{\beta}^{(MTPA)}(\rho)}{\partial \rho_e} + \qquad (26)$$

$$\frac{\partial T_{avg}^{(MTPA)}(\rho)}{\partial L_{qd}(\rho)} \frac{\partial L_{qd}(\rho)}{\partial \rho_e} + \frac{\partial T_{avg}^{(MTPA)}(\rho)}{\partial \Phi_{PM}(\rho)} \frac{\partial \Phi_{PM}(\rho)}{\partial \rho_e}$$

$$\frac{\partial T_{avg}^{(MTPA)}(\rho)}{\partial \overline{\beta}^{(MTPA)}(\rho)} = \frac{3}{4} P_r \big(-\Phi_{PM}(\rho) I_{s\,max}^2 \sin(\overline{\beta}^{(MTPA)}(\rho)) + \qquad (27)$$

$$L_{qd}(\rho) I_{s\,max}^2 \cos(2\overline{\beta}^{(MTPA)}(\rho))\big)$$

$$\frac{\partial T_{avg}^{(MTPA)}(\rho)}{\partial L_{qd}(\rho)} = \frac{3}{8} P_r I_{s\,max}^2 \sin(2\overline{\beta}^{(MTPA)}(\rho)) \qquad (28)$$

$$\frac{\partial T_{avg}^{(MTPA)}(\rho)}{\partial \Phi_{PM}(\rho)} = \frac{3}{8} P_r I_{s\,max}^2 \cos(\overline{\beta}^{(MTPA)}(\rho)) \qquad (29)$$

FIGS. 6, 7, 8a, 8b, 8c, 8d, 9, and 10 are diagrams for describing effects of the topology optimization-based design according to the present disclosure.

For example, the computer device 300 performs the topology optimization-based design by applying a technology of the present disclosure. First, an optimal design problem is defined. In order to verify the validity of the present disclosure, objective functions and a constraint are set as in Equation 30: a design variable: the structure (refer to FIG. 2) of the iron core 121 of the rotor 120, a objective function 1: the maximization of the MTPA torque (Equation 18), a objective function 2: the minimization of the torque ripple (Equation 7), and the constraint: structural compliance is set to be smaller than a target value (C*).

$$\text{Find } \rho \qquad (30)$$

$$\text{to minimize } f(\rho) = \left(-\frac{T_{avg}^{(MTPA)}(\rho)}{T_0^*} + \frac{T_{ripple}(\rho)}{T_1^*}\right)$$

$$\text{subject to } g_1(\rho) = \left(\frac{C(\rho)}{C^*} - 1\right) \le 0 \quad \rho^{min} \le \rho_e \le \rho^{min}$$

$$\text{for } e = 1, \ldots, e_{max}$$

In this case, in order to improve the optimization convergence of the topology optimization-based design algorithm, two stages (i.e., a first stage and a second stage) are constructed. An object of the first stage is to derive an ideal (cannot be fabricated) and high torque rotor design and an optimal current control condition. An object of the second stage is to derive a manufacturable rotor design when the optimal current control condition is applied.

Specifically, the computer device 300 includes an algorithm having two or more stages in designing the iron core 121 of the electric motor 100 in which at least one permanent magnet 127 has been inserted into the rotor 120. The computer device 300 derives the ideal rotor design and the optimal current control condition in the first stage, and derives the manufacturable rotor design in the second stage.

Figure 6:
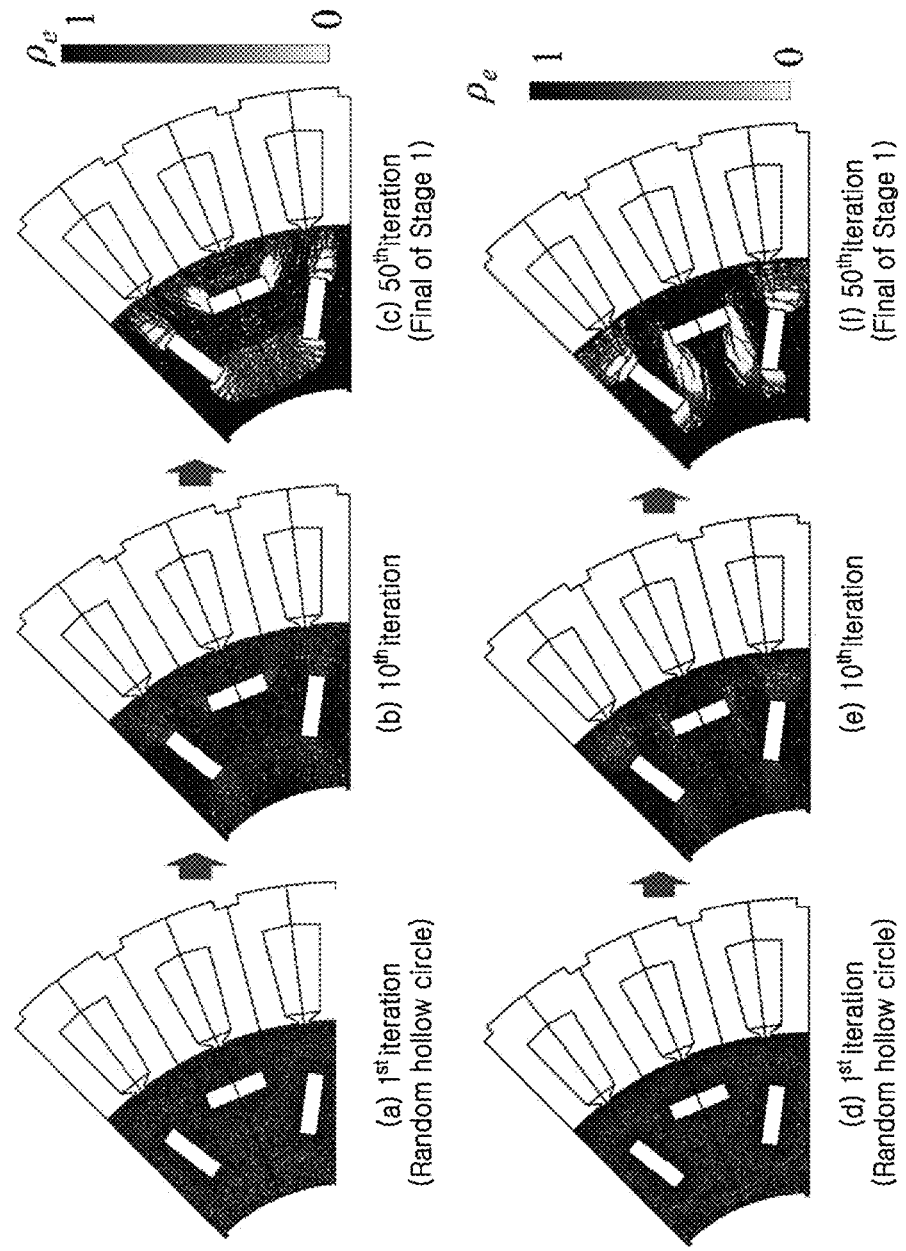
FIGS. 6, 7, 8a, 8b, 8c, 8d, 9, and 10 are diagrams for describing effects of the topology optimization-based design according to the present disclosure.
Figure 7:
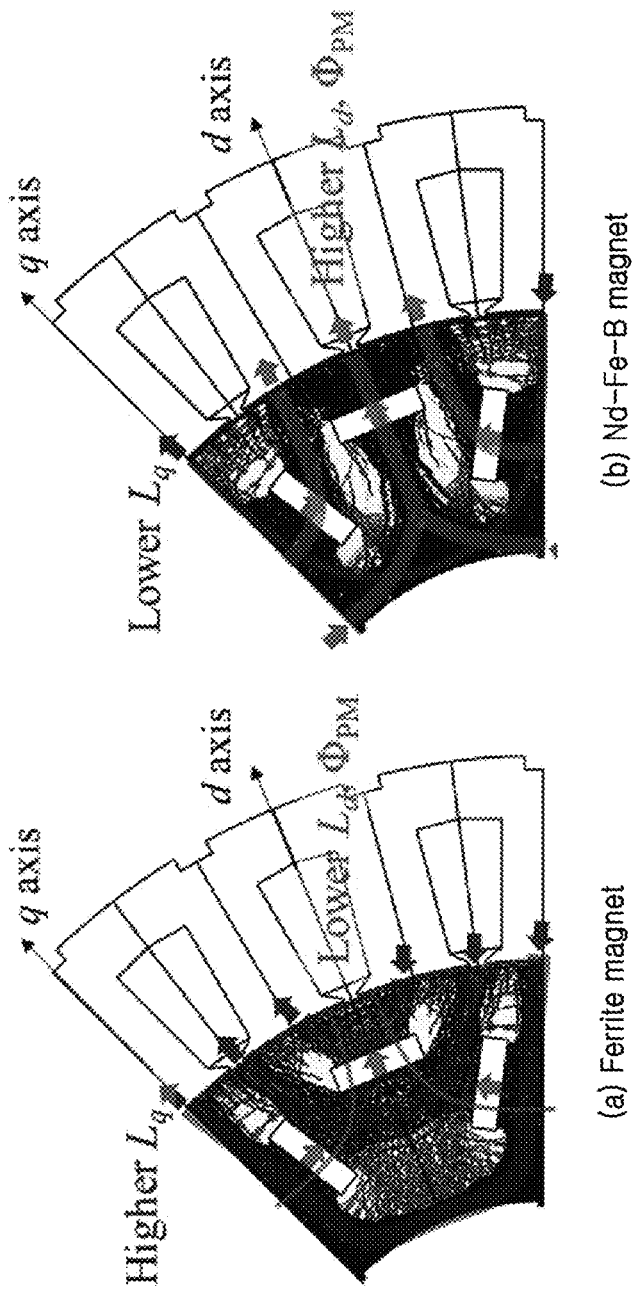
Figure 8A:
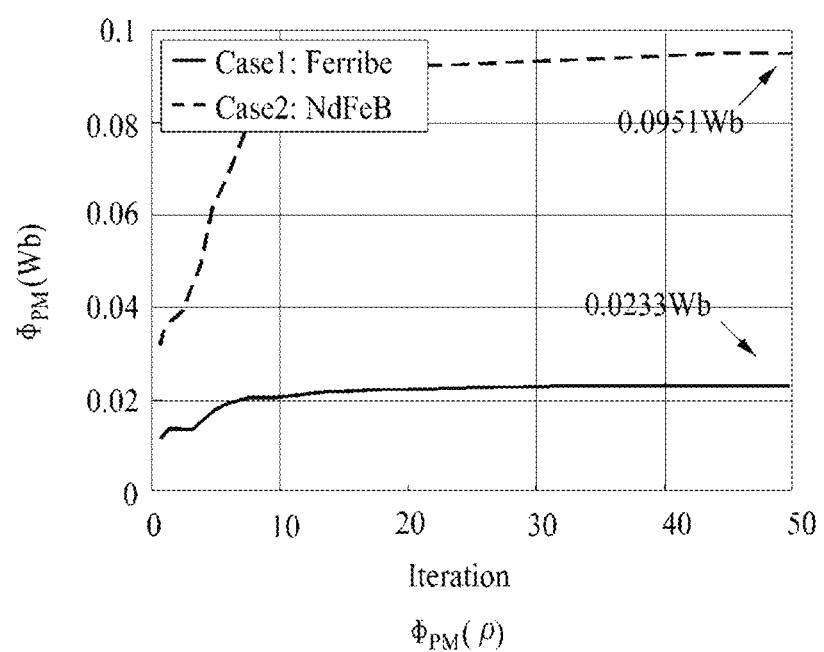
Figure 8B:
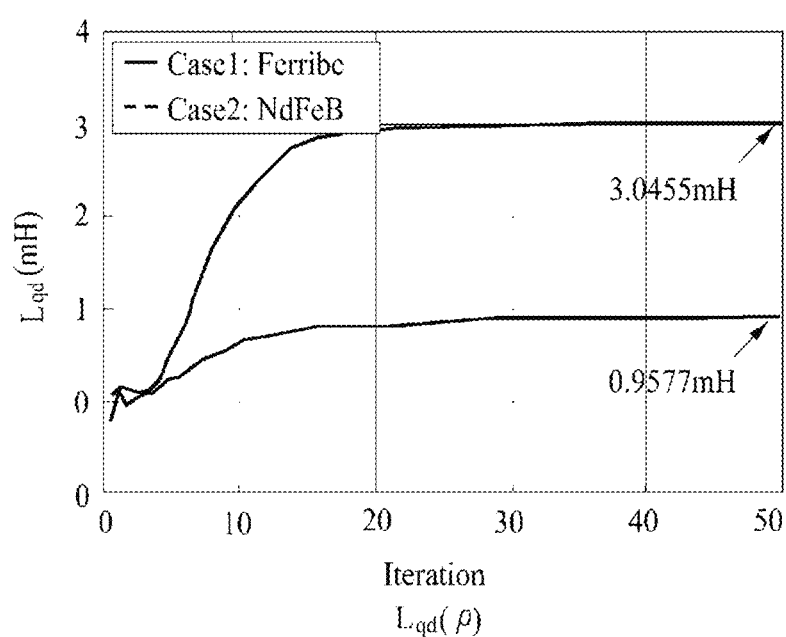
Figure 8C:
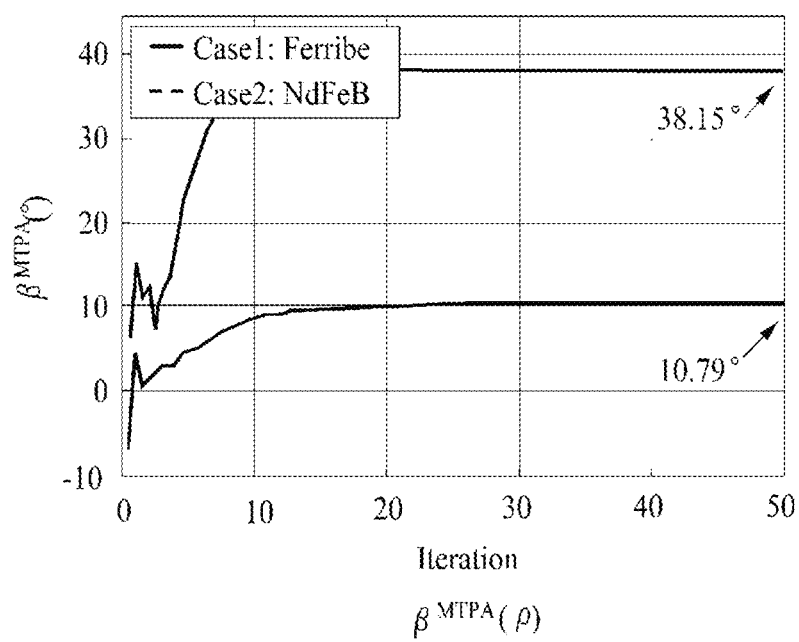
Figure 8D:
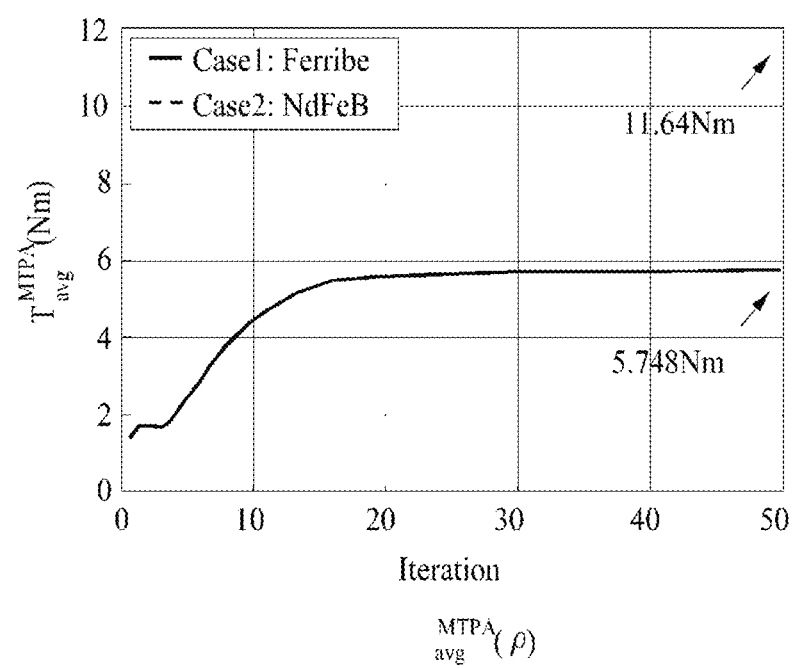
Figure 9:
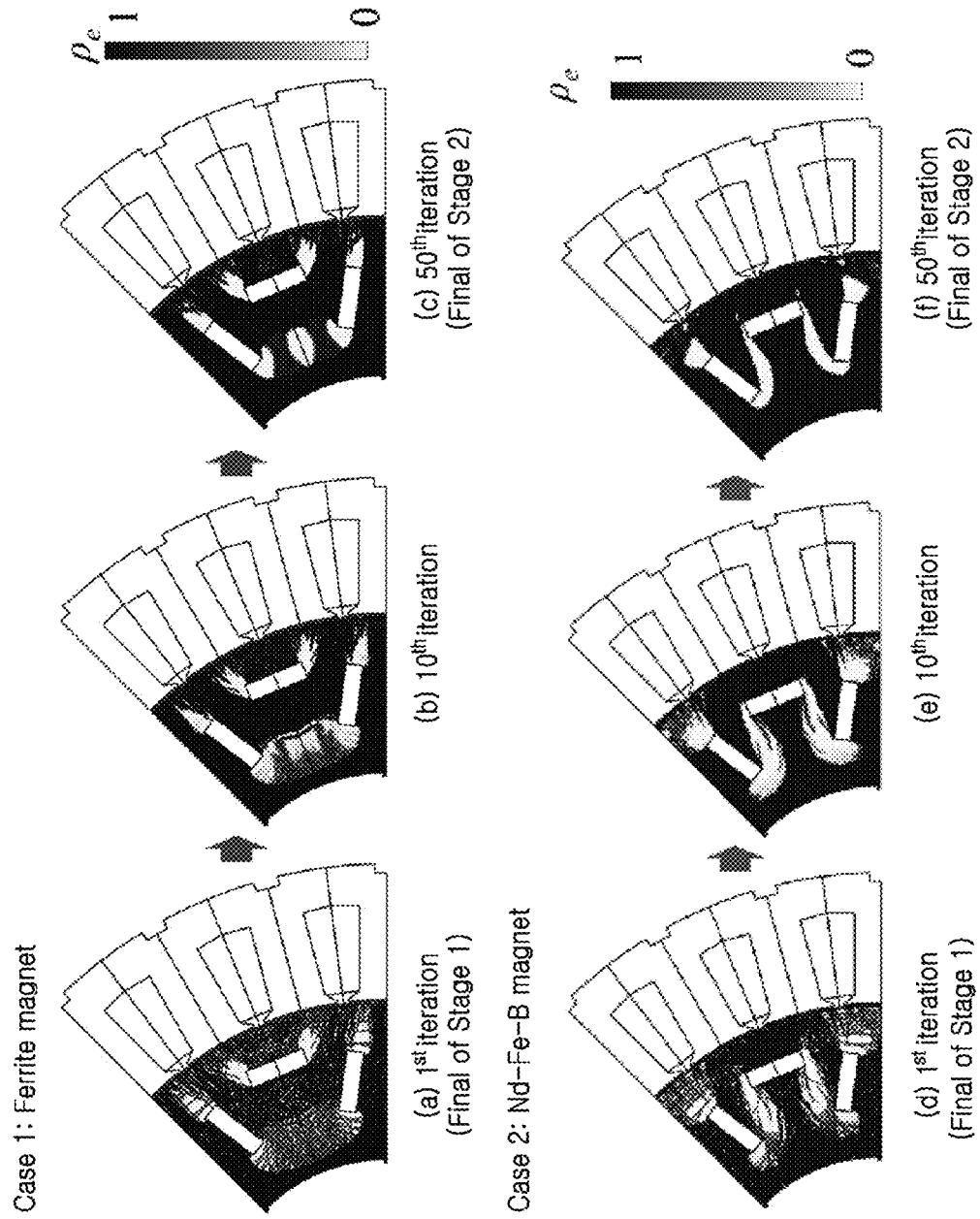

The first stage is performed. FIG. 6 illustrates changes for each type of an iteration of the iron core 121 of the rotor 120 when the first stage optimal design is performed. In the present embodiment, a black finite element means iron ($\rho_e=1$), and a white finite element means the air ($\rho_e=0$). In this case, as in FIG. 6, two cases to which different types of magnet strength were applied were applied: the first case in which a ferrite 0.3 Tesla magnet was applied, and the second case in which a neodymium (Nd—Fe—B) 1.2 Tesla magnet was applied. As illustrated in FIG. 7, if the algorithm is used, the iron core 121 of the rotor 120 can be optimized based on a given design condition. It can be seen that an optimal shape of the iron core 121 is different depending on the intensity of the permanent magnet 127.

In the first case, the electric motor 100 into which the ferrite magnet has been inserted is optimized to have a structure of the iron core 121 in which the magnetic flux ($\Phi_{PM}$) of the permanent magnet can be partially used while maximizing an inductance difference ($L_q(\rho)-L_d(\rho)$) between the q axis and the d axis in order to increase reluctance torque that is generated by a salient ratio of the iron core because the ferrite magnet has weak magnetism. In this case, as illustrated in FIG. 8, an optimal current topology angle ($\beta^{MTPA}(\rho)$) of the stator 110 to which MTPA control has been applied converges on a great value so that the inductance difference $L_q(\rho)-L_d(\rho)$ can be used.

In the second case, the electric motor 100 into which the neodymium magnet has been inserted is optimized to have a structure of the iron core 121 in which the torque of the permanent magnet attributable to strong magnetic flux ($\Phi_{PM}$) of the permanent magnet rather than the reluctance torque attributable to the inductance difference $L_q(\rho)-L_d(\rho)$ can be used because the neodymium magnet has strong magnetism. In this case, as illustrated in FIG. 8, an optimal current topology angle ($\beta^{MTPA}(\rho)$) of the stator 110 to which MTPA control has been applied has a small value so that the magnetic flux ($\Phi_{PM}$) of the permanent magnet can be used to a maximum extent.

In FIG. 8, (a) and (b) illustrate changes in the design-dependent motor parameter ($\Phi_{PM}(\rho)$, $L_{qd}(\rho)$) for each type of an iteration in the optimization of the first stage. In FIG. 8, (c) illustrates a change in the design-dependent current condition (MTPA current topology angle ($\beta^{MTPA}(\rho)$). In FIG. 8, (d) illustrates a change in design-dependent MTPA torque ($T_{evo}^{MTPA}(\rho)$). It may be seen that the design of the rotor converges on a design capable of maximizing MTPA torque. It may be seen that the motor parameter also well converges as the design variable. That is, convergence in FIG. 8 proves the sensitivity equation of the present disclosure, that is, Equations 19 to 29 have been correctly developed.

The second stage is performed. In this case, in order to obtain a manufacturable rotor design, a filtering scheme is used in the present disclosure. Optimization filtering is a scheme in which a value or sensitivity of a design variable is influenced by a value or sensitivity of a neighbor design variable. A filtering scheme which may be applied includes a sensitivity-based filter, a density-based filter, and a Helmholtz filter. When the optimization filtering is applied, as in FIG. 9, a manufacturable output can be obtained. The sensitivity-based filter was applied to this example.

Equation 31 illustrates an example of the definition of a neighborhood for applying the sensitivity-based filter to electromagnetic performance factors (e.g., average torque and a torque ripple) and structure performance factors (e.g., structural compliance and load). In Equation 31, $r_{filter}$ means the radius of the sensitivity-based filter.

$$\begin{cases} \prod_e^{(electric)} = \{e' | \|r_{e'} - r_e\| \le r_{filter}^{(electric)}\}_{\text{for electromagnetic problem}} \\ \prod_e^{(mechanical)} = \{e' | \|r_{e'} - r_e\| \le r_{filter}^{(mechanical)}\}_{\text{for mechanical problem}} \end{cases} \qquad (31)$$

If the neighborhood is defined by using Equation 31, load functions for the electromagnetic/structure performance factors may be represented as in Equation 32.

$$\begin{cases} w^{(electric)}(\rho_{e'}) &= \{1 - \|r_{e'} - r_e\|/r_{filter}^{(electric)}\}^2 \\ w^{(mechanical)}(\rho_{e'}) &= \{1 - \|r_{e'} - r_e\|/r_{filter}^{(mechanical)}\}^2 \end{cases} \quad (32)$$

When the load function is applied to the optimal design problem (Equation 30), sensitivity may be modified as in Equations 33 and 34.

$$\frac{\partial \tilde{f}(\rho)}{\partial \rho_e} = \frac{\sum_{e' \in \Pi_e^{(electric)}} w^{(electric)}(\rho_{e'}) \rho_{e'} \frac{\partial f(\rho)}{\partial \rho_{e'}}/\chi_{e'}}{\rho_e/\chi_e \sum_{e' \in \Pi_e^{(electric)}} w^{(electric)}(\rho_{e'})} \quad (33)$$

$$\frac{\partial \tilde{g}_1(\rho)}{\partial \rho_e} = \frac{\sum_{e' \in \Pi_e^{(mechanical)}} w^{(mechanical)}(\rho_{e'}) \rho_{e'} \frac{\partial g_1(\rho)}{\partial \rho_{e'}}/\chi_{e'}}{\rho_e/\chi_e \sum_{e' \in \Pi_e^{(mechanical)}} w^{(mechanical)}(\rho_{e'})} \quad (34)$$

That is, as the radius of the miter filter in Equation 31 is increased, the finite element is greatly influenced by a neighbor finite element. Accordingly, a manufacturable optimal design output is derived (refer to FIG. 8) as fine structures, such as the webs 122 and the bridge 124, are united or disappear.

Figure 10:
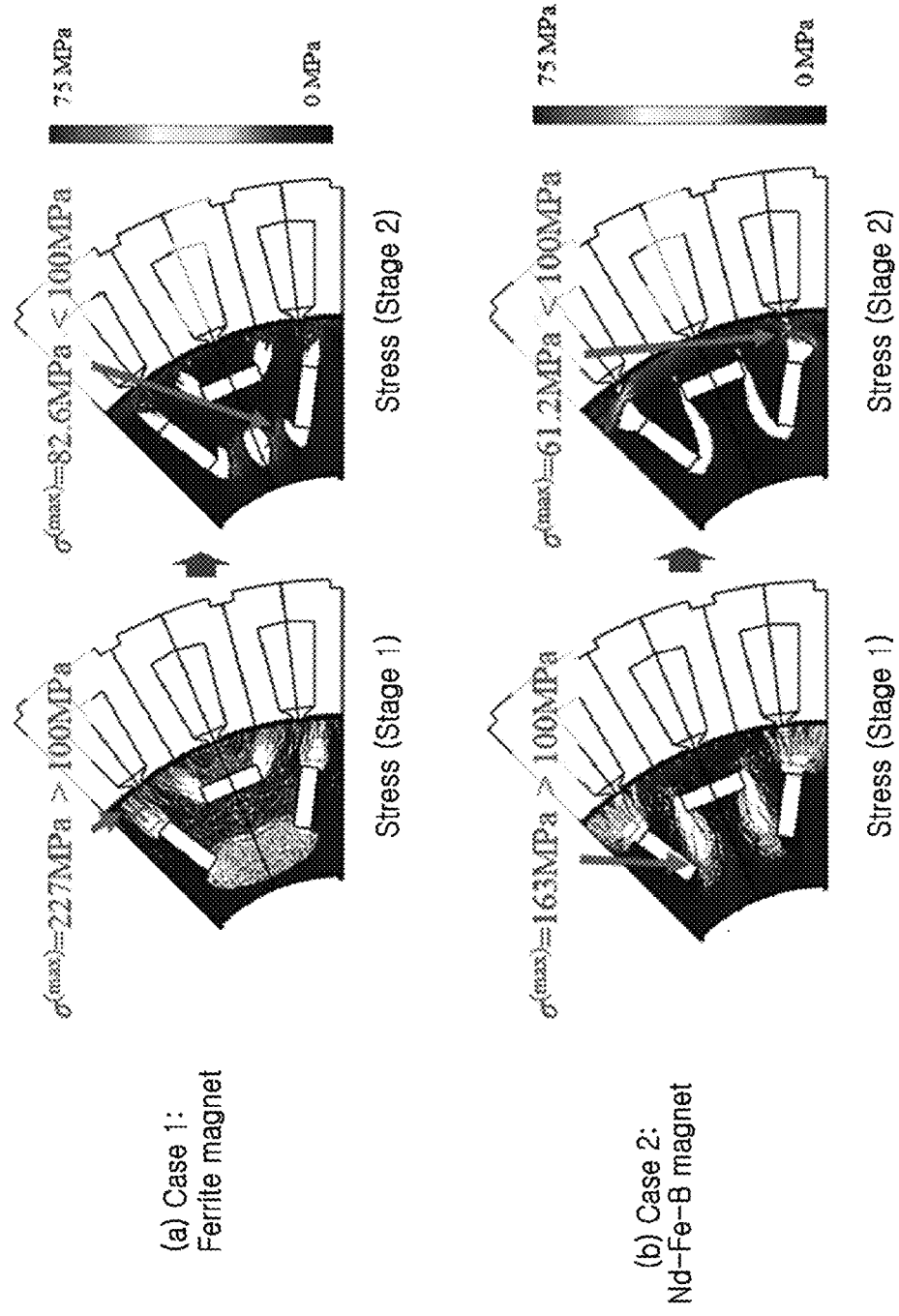

As illustrated in FIG. 10, it may be seen that a manufacturable optimal design output in the second stage is structurally safe: maximum stress (82.6 MPa)<permitted yield strength (100 MPa) generated in the first case: structurally safe, and maximum stress (61.2 MPa)<permitted yield strength (100 MPa) generated in the second case: structurally safe.

Accordingly, in a conventional technology, an arbitrary fixed current is applied to the stator 110. In contrast, in the present disclosure, a current can be adaptively applied to the stator 110 because an optimal current control condition according to a structure of the rotor 120 is recalculated from the results of the multiphysics finite element analysis of the rotor 120. Specifically, when the topology optimization-based design is performed, the topology of the rotor 120 is changed into a structure for minimizing a objective function while satisfying a constraint according to an optimization iteration. In this case, in the present disclosure, a current can be adaptively applied to the stator 110 because an optimal current control condition according to a change in the structure of the rotor 120 is recalculated.

Furthermore, in a conventional technology, it is difficult to design the electric motor 100 having non-linearity (e.g., magnetic flux saturation and leakage magnetic flux) and a complicated structure because structure information of the rotor 120, for example, the thicknesses, locations, and numbers of the webs 122 and the bridge 124 are previously designed based on an engineer's intuition. In the present disclosure, however, complicated structure information on the iron core 121 of the rotor 120 is not necessary because the topology optimization-based design is applied. Accordingly, a complicated electric motor 100 having multiple constraints can be easily designed without the need to depend on an engineer's intuition. That is, through the present disclosure, a rotor design having high torque and an optimal current condition can be derived.

As a result, the present disclosure can significantly reduce time and expenses that are necessary for a design, manufacturing, and experiments because the production of multiple single-products and repeated experiments for each single-product are not required.

In summary, the present disclosure proposes the method and device for optimally designing the topology of the permanent magnet insertion type electric motor 100 by considering maximum torque control performance per ampere and field-weakening control performance.

The present disclosure provides a method of the computer device 300 for the topology optimization-based design of the electric motor 100 including the stator 110 and the rotor 120 and having the permanent magnet 127 inserted into the rotor 120.

According to various embodiments, the method includes the step (step 420) of calculating an optimal current control condition for the stator 110 according to a structure of the rotor 120, and the step (step 430) of deriving a topology optimization-based design of the rotor 120 by applying the optimal current control condition.

According to various embodiments, a design variable of the rotor 120 is defined as the relative density of each of finite elements divided from the rotor 120.

According to various embodiments, the step (step 420) of calculating the optimal current control condition includes a step of deriving motor parameters of the electric motor 100 as functions of the design variable, and a step of deriving the optimal current control condition by putting the motor parameters into an optimal current calculation algorithm.

According to various embodiments, the motor parameters indicate magnetic flux of the permanent magnet 127, and a difference between inductances of two axes that define a rotation coordinate system in the rotation coordinate system in which the rotor 120 is rotated.

According to various embodiments, the optimal current calculation algorithm includes at least one of a maximum torque per ampere (MTPA) algorithm or a field weakening or flux weakening (FW) control algorithm, and calculates an optimal current. The FW control algorithm calculates the optimal current control condition capable of generating maximum torque per ampere while satisfying a voltage limit in order to operate the electric motor within the voltage limit.

According to various embodiments, the method further includes a step of calculating at least one of average torque, a torque ripple, or structural compliance of a given topology of the electric motor 100 through multiphysics finite element analysis, and the step (step 410) of deriving at least one of the average torque, the torque ripple, or the structural compliance as the functions of the design variable.

According to various embodiments, the step (step 430) of deriving the topology optimization-based design includes a step of calculating the sensitivity of a objective function and constraint of the design variable, and a step of deriving the topology optimization-based design that minimizes or maximizes the objective function while satisfying the constraint by using the sensitivity.

According to various embodiments, the step of calculating the sensitivity includes a step of calculating the sensitivity from the functions of the design variable based on at least one of the average torque, the torque ripple, the structural compliance, the motor parameters, or an MTPA current topology angle.

According to various embodiments, the sensitivity includes at least one of the sensitivity of a design variable for the motor parameters, the sensitivity of a design variable for a current topology angle at which maximum torque may be generated, the sensitivity of a design variable for maximum torque, or the sensitivity of a design variable for a back electromotive voltage.

According to various embodiments, the step (step 420) of calculating the optimal current control condition includes calculating the optimal current control condition based on the ideal rotor 120.

According to various embodiments, the step (step 430) of deriving the topology optimization-based design includes deriving a manufacturable structure of the rotor 120 by applying the optimal current control condition.

According to various embodiments, the optimal current control condition is adaptively updated based on a change in the topology of the rotor 120 according to a change in the structure of the rotor 120.

According to various embodiments, the relative density is determined as a ratio of iron and air in each of the finite elements.

The present disclosure provides the computer device 300 for the topology optimization-based design of the electric motor 100 including the stator 110 and the rotor 120 and having the permanent magnet 127 inserted into the rotor 120.

According to various embodiments, the computer device 300 includes the memory 330, and the processor 340 connected to the memory 330 and configured to execute at least one instruction stored in the memory 330.

According to various embodiments, the processor 340 is configured to calculate an optimal current control condition for the stator 110 according to a structure of the rotor 120, and derive a topology optimization-based design of the rotor 120 by applying the optimal current control condition.

According to various embodiments, a design variable of the rotor 120 is defined as the relative density of each of finite elements divided from the rotor 120.

According to various embodiments, the processor 340 is configured to calculate the optimal current control condition includes a step of deriving motor parameters of the electric motor 100 as functions of the design variable, and to derive the optimal current control condition by putting the motor parameters into an optimal current calculation algorithm.

According to various embodiments, the motor parameters indicate magnetic flux of the permanent magnet 127, and a difference between inductances of two axes that define a rotation coordinate system in the rotation coordinate system in which the rotor 120 is rotated.

According to various embodiments, the optimal current calculation algorithm includes at least one of a maximum torque per ampere (MTPA) algorithm or a field weakening or flux weakening (FW) control algorithm, calculates an optimal current. The FW control algorithm calculates the optimal current control condition capable of generating maximum torque per ampere while satisfying a voltage limit in order to operate the electric motor within the voltage limit.

According to various embodiments, the processor 340 is configured to calculate at least one of average torque, a torque ripple, or structural compliance of a given topology of the electric motor 100 through multiphysics finite element analysis, and to derive at least one of the average torque, the torque ripple, or the structural compliance as the functions of the design variable.

According to various embodiments, the processor 340 is configured to calculate the sensitivity of a objective function and constraint of the design variable, and derive a topology optimization-based design that minimizes or maximizes the objective function while satisfying the constraint by using the sensitivity.

According to various embodiments, the processor 340 is configured to calculate the sensitivity from the functions of the design variable based on at least one of the average torque, the torque ripple, the structural compliance, the motor parameters, or an MTPA current topology angle.

According to various embodiments, the sensitivity includes at least one of the sensitivity of a design variable for the motor parameters, the sensitivity of a design variable for a current topology angle at which maximum torque may be generated, the sensitivity of a design variable for maximum torque, or the sensitivity of a design variable for a back electromotive voltage.

According to various embodiments, the processor 340 is configured to calculate the optimal current control condition based on the ideal rotor 120 and to derive a manufacturable structure of the rotor 120 by applying the optimal current control condition.

According to various embodiments, the optimal current control condition is adaptively updated based on a change in the topology of the rotor 120 according to a change in the structure of the rotor 120.

According to various embodiments, the relative density is determined as a ratio of iron and air in each of the finite elements.

The aforementioned method may be provided as a computer program recorded on a computer-readable recording medium in order to be executed in a computer. The medium may continue to store a program executable by a computer or may temporarily store the program for execution or download. Furthermore, the medium may be various recording means or storage means having a form in which one or a plurality of pieces of hardware has been combined. The medium is not limited to a medium that is directly connected to a computer system, but may be ones that are distributed and present in a network. Examples of the medium may be magnetic media such as a hard disk, a floppy disk, and a magnetic tape, optical media such as CD-ROM and a DVD, magneto-optical media such as a floptical disk, and media configured to store a program command, including, ROM, RAM, and a flash memory. Furthermore, examples of another medium includes recording media and/or storage media managed in an app store in which apps are distributed, a site in which various other pieces of software are supplied or distributed, a server, etc.

The methods, operations or schemes of this disclosure may be implemented by various means. For example, such schemes may be implemented as hardware, firmware, software, or a combination of them. Those skilled in the art will understand that various exemplary logical blocks, modules, circuits, and algorithm steps described in association with the present disclosure may be implemented as electronic hardware, computer software, or combinations of them. In order to clearly describe such a mutual substitution of hardware and software, various exemplary components, blocks, modules, circuits, and steps have been generally described above from their functional viewpoints. Whether such a function is implemented as hardware or implemented as software is different depending on design requirements assigned to a specific application and the entire system. Those skilled in the art may implement a function described in various manners for each specific application, but such implementations should not be construed as departing from the scope of this disclosure.

In a hardware implementation, processing units used to perform schemes may be implemented within one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform functions described in this disclosure, a computer, or a combination of them.

Accordingly, various exemplary logical blocks, modules, and circuits described in association with this disclosure may be implemented or performed as a general-purpose processor, a DSP, an ASIC, an FPGA or another programmable logical device, a discrete gate or transistor logic, discrete hardware components or a given combination of them designed to perform functions described in the present disclosure. The general-purpose processor may be a microprocessor, but alternatively, the processor may be a given conventional processor, controller, microcontroller, or state machine. Furthermore, the processor may be implemented as a combination of computing devices, for example, a DSP and a microprocessor, a plurality of microprocessors, one or more microprocessors associated with a DSP core, or a combination of given other components.

In firmware and/or software implementation, schemes may be implemented as instructions stored in a computer-readable recording medium, such as random access memory (RAM), a read-only memory (ROM), a non-volatile random access memory (NVRAM), a programmable read-only memory (PROM), an erasable programmable read-only memory (EPROM), an electrically erasable PROM (EEPROM), a flash memory, a compact disc (CD), a magnetic or optical data storage device. The instructions may be executed by one or more processors and may enable a processor(s) to perform specific aspects of a function described in this disclosure.

The aforementioned embodiments have been described as using aspects of the subject matter now disclosed in one or more independent computer systems, but this disclosure is not limited thereto and may be implemented in association with a network or a given computing environment, such as a distributed computing environment. Furthermore, in this disclosure, aspects of the subject matter may be implemented in a plurality of processing chips or devices, and storage may be similarly influenced in a plurality of devices. Such devices include PCs, network servers, and portable devices.

Although this disclosure has been described in relation to some embodiments, the disclosure may be modified and changed in various ways without departing from the scope of this disclosure which may be understood by those skilled in the art to which an invention of this disclosure belongs. Furthermore, such a modification and change should be considered as belonging to the scope of the claims appended in the specification.

The invention claimed is:

1. A method of a computer device for a topology optimization-based design of an electric motor comprising a stator and a rotor and having a permanent magnet inserted into the rotor, the method comprising:
calculating an optimal current control condition for the stator according to a structure of the rotor; and
deriving a topology optimization-based design of the rotor by applying the optimal current control condition,
wherein the calculating of the optimal current control condition comprises:
deriving motor parameters of the electric motor as functions of the design variables; and
deriving the optimal current control condition by putting the motor parameters into an optimal current calculation algorithm,
wherein the motor parameters include magnetic flux strength ($\Phi_{PM}$) of the permanent magnet and a difference ($L_{qd}=L_q-L_d$) between a q-axis inductance and a d-axis inductance indicative of a saliency ratio of an iron core of the electric motor in a d-q axis rotation coordinate system,
wherein the optimal current calculation algorithm comprises a maximum torque per ampere (MTPA) algorithm and a field weakening or flux weakening (FW) control algorithm, and calculates an optimal current,
wherein the FW control algorithm calculates the optimal current control condition capable of generating maximum torque per ampere while satisfying a voltage limit in order to operate the electric motor within the voltage limit,
wherein the deriving of the motor parameters comprises:
deriving the magnetic flux strength ($\Phi_{PM}$) as a first function $\Phi_{PM}(\rho)$ of a set of the design variables ($\rho=[\rho_1, \rho_2, \ldots, \rho_{emax}]^T$), and
deriving the difference ($L_{qd}=L_q-L_d$) between the q-axis inductance and the d-axis inductance as a second function $L_{qd}(\rho)$ of the set of the design variables ($\rho=[\rho_1, \rho_2, \ldots, \rho_{emax}]^T$),
wherein the first function is expressed by Equation (1) using a d-axis current ($i_d$) and a q-axis current ($i_q$)

$$\Phi_{PM}(\rho)=4/3 1/I_{smax}\cos(\beta^*)T_{avg}(\rho,i_d^*,i_q)/P_r \quad \text{(Equation (1))},$$

wherein the second function is expressed by Equation (2) using a d-axis current($i_d$) and a q-axis current ($i_q$), $$L_{qd}(\rho)=L_q(\rho)-L_d(\rho)=4/3 1/P_r(T_{avg}(\rho,i_d,i_q)-T_{avg}(\rho,i_d^*,i_q))/-i_q)(i_d-i_d^*) \quad \text{(Equation (2))},$$

wherein the deriving of the optimal current control condition comprises substituting the first function and the second function into a third function of the MTPA algorithm for calculating a MTPA current topology angle ($\partial^{MTPA}(\rho)$), thereby deriving the MTPA current topology angle $\beta^{MTPA}(\rho)$) as the optimal current control condition, and
wherein the third function is expressed by Equation (3), $$\beta^{(MTPA)}(\rho)=\sin^{-1}(-\Phi_{PM}(\rho)+\sqrt{\Phi_{PM}^2(\rho)+8I_{smax}^2 L_{qd}^2(\rho)})/4I_{smax}L_{qd}(\rho) \quad \text{(Equation (3))}.$$

2. The method of claim 1, wherein a design variable of the rotor is defined as relative density of each of finite elements divided from the rotor.

3. The method of claim 2, wherein the relative density is determined as a ratio of iron and air in each of the finite elements.

4. The method of claim 1, further comprising:
calculating at least one of average torque, a torque ripple, or structural compliance of a given topology of the electric motor through multiphysics finite element analysis, and
deriving at least one of the average torque, the torque ripple, or the structural compliance as the functions of the design variables.

5. The method of claim 4, wherein the deriving of the topology optimization-based design comprises:
calculating sensitivity of an objective function and constraint of the design variables; and deriving the topology optimization-based design that minimizes or maximizes the objective function while satisfying the constraint by using the sensitivity.

6. The method of claim 5, wherein the calculating of the sensitivity comprises calculating the sensitivity from the functions of the design variable based on at least one of the average torque, the torque ripple, the structural compliance, the motor parameters, or the MTPA current topology angle, and wherein the sensitivity comprises at least one of sensitivity of a design variable for the motor parameters, sensitivity of a design variable for a current topology angle at which maximum torque is capable of being generated, sensitivity of a design variable for maximum torque, or sensitivity of a design variable for a back electromotive voltage.

7. The method of claim 1, wherein calculating the optimal current control condition comprises calculating the optimal current control condition based on an ideal rotor, and wherein deriving the topology optimization-based design comprises deriving a manufacturable structure of the rotor by applying the optimal current control condition.

8. The method of claim 1, wherein the optimal current control condition is adaptively updated based on a change in the topology of the rotor according to a change in the structure of the rotor.

9. A computer device for a topology optimization-based design of an electric motor comprising a stator and a rotor and having a permanent magnet inserted into the rotor, the computer device comprising:

memory; and a processor connected to the memory and configured to execute at least one instruction stored in the memory, wherein the processor is configured to:

calculate an optimal current control condition for the stator according to a structure of the rotor, and derive a topology optimization-based design of the rotor by applying the optimal current control condition, wherein the processor is configured to calculate the optimal current control condition by:

deriving motor parameters of the electric motor as functions of the design variables; and deriving the optimal current control condition by putting the motor parameters into an optimal current calculation algorithm, wherein the motor parameters include magnetic flux strength ($\Phi_{PM}$) of the permanent magnet and a difference ($L_{qd}=L_q-L_d$) between a q-axis inductance and a d-axis inductance indicative of a saliency ratio of an iron core of the electric motor in a d-q axis rotation coordinate system, wherein the optimal current calculation algorithm comprises a maximum torque per ampere (MTPA) algorithm and a field weakening or flux weakening (FW) control algorithm, and calculates an optimal current, wherein the FW control algorithm calculates the optimal current control condition capable of generating maximum torque per ampere while satisfying a voltage limit in order to operate the electric motor within the voltage limit, wherein the deriving of the motor parameters comprises:

deriving the magnetic flux strength ($\Phi_{PM}$) as a first function $\Phi_{PM}(\rho)$ of a set of the design variables ($\rho=[\rho_1, \rho_2, \ldots, \rho_{emax}]^T$), and deriving the difference ($L_{qd}=L_q-L_d$) between the q-axis inductance and the d-axis inductance as a second function $L_{qd}(\rho)$ of the set of the design variables ($\rho=[\rho_1, \rho_2, \ldots, \rho_{emax}]^T$), wherein the first function is expressed by Equation (1) using a d-axis current ($i_d$) and a q-axis current ($i_q$), $$\Phi_{PM}(\rho)=4/3 1/I_{smax} \cos(\beta^*) T_{avg}(\rho, i_d^*, i_q)/P_r \quad \text{(Equation (1))},$$

wherein the second function is expressed by Equation (2) using a d-axis current ($i_d$) and a q-axis current ($i_q$), $$L_{qd}(\rho)=L_q(\rho)-L_d(\rho)=4/3 1/P_r(T_{avg}(\rho,i_d,i_q)-T_{avg}(\rho,i_d^*,i_q))/-i_q)(i_d-i_d^*) \quad \text{(Equation (2))},$$

wherein the deriving of the optimal current control condition comprises substituting the first function and the second function into a third function of the MTPA algorithm for calculating a MTPA current topology angle ($\beta^{MTPA}(\rho)$), thereby deriving the MTPA current topology angle (A $\beta^{MTPA}(\rho)$ as the optimal current control condition, and wherein the third function is expressed by Equation (3), $$\beta^{(MTPA)}(\rho)=\sin^{-1}(-\Phi_{PM}(\rho)+\Phi_{PM}^2(\rho)+8I_{smax}^2 L_{qd}^2(\rho)/4I_{smax} L_{qd}(\rho) \quad \text{(Equation (3))}.$$

10. The computer device of claim 9, wherein a design variable of the rotor is defined as relative density of each of finite elements divided from the rotor.

11. The computer device of claim 10, wherein the relative density is determined as a ratio of iron and air in each of the finite elements.

12. The computer device of claim 10, wherein the processor is configured to:

calculate at least one of average torque, a torque ripple, or structural compliance of a given topology of the electric motor through multiphysics finite element analysis, and derive at least one of the average torque, the torque ripple, or the structural compliance as the functions of the design variables.

13. The computer device of claim 12, wherein the processor is configured to:

calculate sensitivity of an objective function and constraint of the design variables, and derive the topology optimization-based design that minimizes or maximizes the objective function while satisfying the constraint by using the sensitivity.

14. The computer device of claim 13, wherein the processor is configured to calculate the sensitivity from the functions of the design variable based on at least one of the average torque, the torque ripple, the structural compliance, the motor parameters, or the MTPA current topology angle, and wherein the sensitivity comprises at least one of sensitivity of a design variable for the motor parameters, sensitivity of a design variable for a current topology angle at which maximum torque is capable of being generated, sensitivity of a design variable for maximum torque, or sensitivity of a design variable for a back electromotive voltage.

15. The computer device of claim 9, wherein the processor is configured to:

calculate the optimal current control condition based on an ideal rotor, and derive the topology optimization-based design comprises deriving a manufacturable structure of the rotor by applying the optimal current control condition.

16. The computer device of claim 9, wherein the optimal current control condition is adaptively updated based on a change in the topology of the rotor according to a change in the structure of the rotor.

17. A non-transitory computer-readable recording medium in which a computer program for executing, in a computer device, a method for a topology optimization-based design of an electric motor comprising a stator and a rotor and having a permanent magnet inserted into the rotor, wherein the method comprises:

calculating an optimal current control condition for the stator according to a structure of the rotor; and deriving a topology optimization-based design of the rotor by applying the optimal current control condition, wherein the calculating of the optimal current control condition comprises:

deriving motor parameters of the electric motor as functions of the design variables; and deriving the optimal current control condition by putting the motor parameters into an optimal current calculation algorithm, wherein the motor parameters include magnetic flux strength ($\Phi_{PM}$) of the permanent magnet and a difference ($L_{qd}=L_q-L_d$) between a q-axis inductance and a d-axis inductance indicative of a saliency ratio of an iron core of the electric motor in a d-q axis rotation coordinate system, wherein the optimal current calculation algorithm comprises a maximum torque per ampere (MTPA) algorithm and a field weakening or flux weakening (FW) control algorithm, and calculates an optimal current, wherein the FW control algorithm calculates the optimal current control condition capable of generating maximum torque per ampere while satisfying a voltage limit in order to operate the electric motor within the voltage limit, wherein the deriving of the motor parameters comprises:

deriving the magnetic flux strength ($\Phi_{PM}$) as a first function $\Phi_{PM}(\rho)$ of a set of the design variables ($\rho=[\rho_1, \rho_2, \ldots, \rho_{emax}]^T$), and deriving the difference ($L_{qd}=L_q-L_d$) between the q-axis inductance and the d-axis inductance as a second function $L_{qd}(\rho)$ of the set of the design variables ($\rho=[\rho_1, \rho_2, \rho_{emax}]^T$), wherein the first function is expressed by Equation (1) using a d-axis current (x) and a q-axis current ($i_q$), $$\Phi_{PM}(\rho)=4/3 1/I_{smax} \cos(\beta^*) T_{avg}(\rho, i_d^*, i_q)/P_r \quad \text{(Equation (1))},$$

wherein the second function is expressed by Equation (2) using a d-axis current ($i_d$) and a q-axis current ($i_q$), $$L_{qd}(\rho)=L_q(\rho)-L_d(\rho)=4/3 1/P_r(T_{avg}(\rho, i_d, i_q)-T_{avg}(\rho, i_d^*, i_q))/-i_q)(i_d-i_d^*) \quad \text{(Equation (2))},$$

wherein the deriving of the optimal current control condition comprises substituting the first function and the second function into a third function of the MTPA algorithm for calculating a MTPA current topology angle ($\beta^{MTPA}(\rho)$), thereby deriving the MTPA current topology angle ($\beta^{MTPA}(\rho)$) as the optimal current control condition, and wherein the third function is expressed by Equation (3), $$\beta^{(MTPA)}(\rho)=\sin^{-1}(-\Phi_{PM}(\rho)+\sqrt{\Phi_{PM}^2(\rho)+8I_{smax}^2 L_{qd}^2(\rho)}/4I_{smax}L_{qd}(\rho)) \quad \text{(Equation (3))}.$$

18. The non-transitory computer-readable recording medium of claim 17, wherein a design variable of the rotor is defined as relative density of each of finite elements divided from the rotor.

* * * * *